Figure 1:
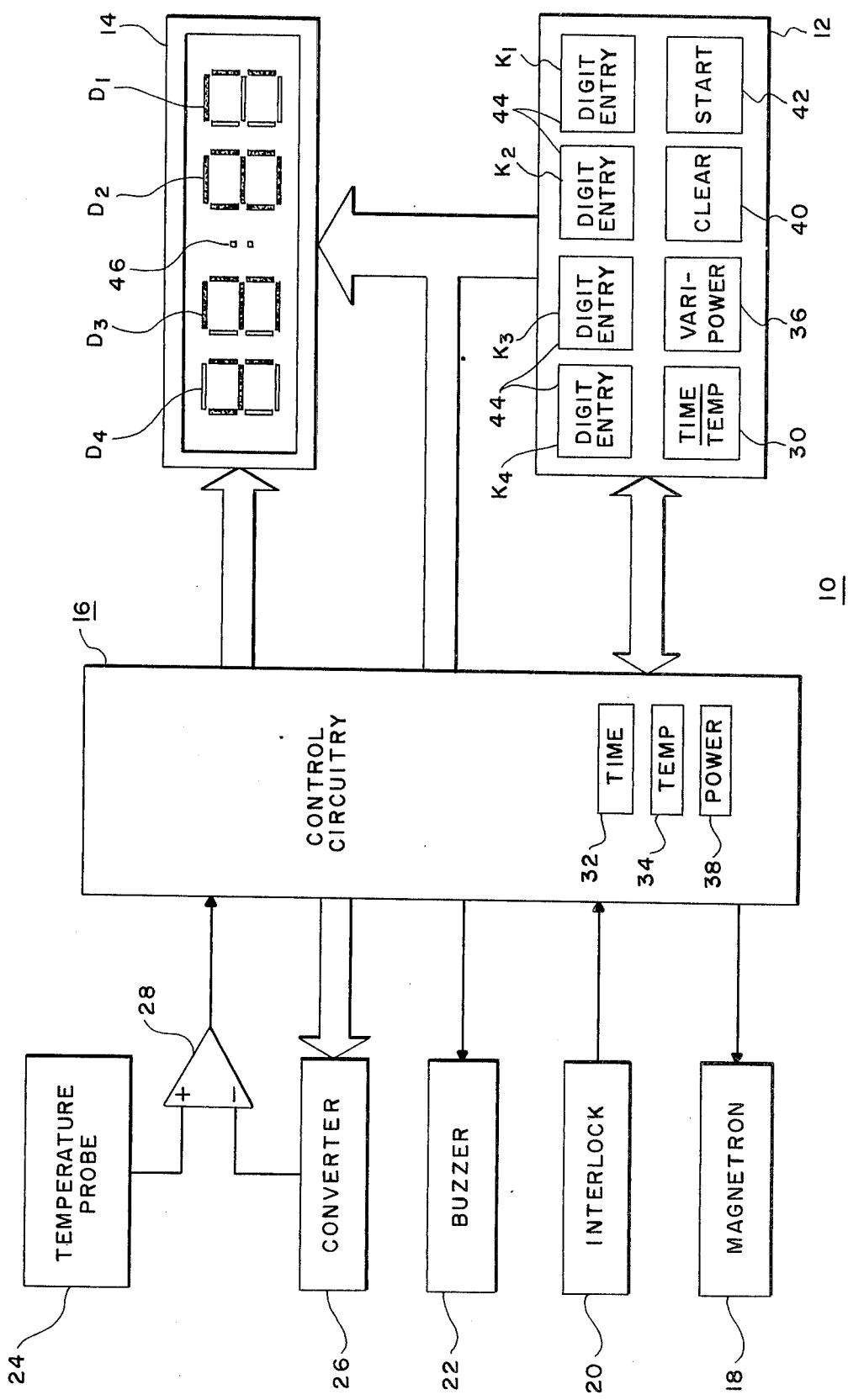

United States Patent [19]

Mason

[11] 4,158,759

[45] Jun. 19, 1979

[54] MICROWAVE OVEN CONTROL SYSTEM

[75] Inventor: William B. Mason, Arlington, Tex.

[73] Assignee: Teccor Electronics, Inc., Euless, Tex.

[21] Appl. No.: 833,907

[22] Filed: Sep. 16, 1977

[51] Int. Cl.² .............................................. H05B 9/06
[52] U.S. Cl. .............................. 219/10.55 B; 219/506; 340/365 R
[58] Field of Search .................. 219/10.55 B, 10.55 R, 219/506; 340/366 G, 365 R, 365 A, 365 S; 126/197; 99/325

[56] References Cited

U.S. PATENT DOCUMENTS

| | | | |
|---|---|---|---|
| 3,819,906 | 6/1974 | Gould, Jr. | 219/506 |
| 3,932,723 | 1/1976 | Tamano et al. | 219/10.55 B |
| 4,011,428 | 3/1977 | Fosnough et al. | 219/10.55 B |

*Primary Examiner*—Arthur T. Grimley

*Attorney, Agent, or Firm*—Hubbard, Thurman, Turner, Tucker & Glaser

[57] ABSTRACT

An electronic display having a plurality of digit positions is employed in conjunction with a keyboard to enter data for controlling the operation of a microwave oven. Each digit position of the display is individually responsive to a corresponding key of the keyboard, whereby actuating such key causes its display digit to run repetitively through a numerical sequence without carrying over into other display digits. Upon stopping actuation of such key, its display digit stops on the numeral displayed at that moment. Other digits of the display may be similarly loaded with data, whereby the fully loaded display represents a control parameter, such as cooking time. Actuating a start key permits the oven to carry out a cooking program in accordance with the data thus entered into the display.

16 Claims, 2 Drawing Figures

MICROWAVE OVEN CONTROL SYSTEM

The present invention pertains generally to digital control devices, and particularly to data entry and control systems in microwave ovens.

Commercially available microwave ovens employ various control devices including switches, dials, clocks, keyboards, and digital displays. The present invention is particularly related to prior art microwave ovens of the type employing keyboards and digital displays for entering control parameters, such as cooking time. Typical prior art keyboards employ ten numerical keys for the decimal numerals 0–9 in conjunction with various other keys or switches for controlling the oven. Typical prior art digital displays employ devices having seven LED segments per digit with four digit positions, operable using known segment and digit driver multiplexing techniques. Data entry to such digital displays is similar to that widely used in hand-held calculators and related equipment. Pressing a first numerical key enters the corresponding numeral into the least significant digit of the display. Pressing a second numerical key then causes the previously entered numeral to shift to the next higher significant digit and enters the corresponding second numeral into the least significant digit of the display. Such shifting and entering continues each time one of the numerical keys is actuated until the display is loaded with the desired control parameter, such as a particular number of minutes and seconds of cooking time.

The present invention has as one of its objectives the reduction of the number of necessary data entry keys with associated simplification of circuitry, and accordingly employs the technique of slew entry as a means of loading a digital display. Slew entry, or slewing, for the purpose of this application will be defined as that technique whereby a display is caused to run through a sequence of characters until a desired character appears.

In accordance with the present invention a keyboard and digital display communicate with circuitry for controlling a microwave oven. Data is loaded into the display by separately slewing each digit position using a corresponding key of the keyboard. Slewing occurs at a suitable rate enabling the user to stop at a desired character in each digit position, thereby loading a control parameter into the display.

Figure 2:
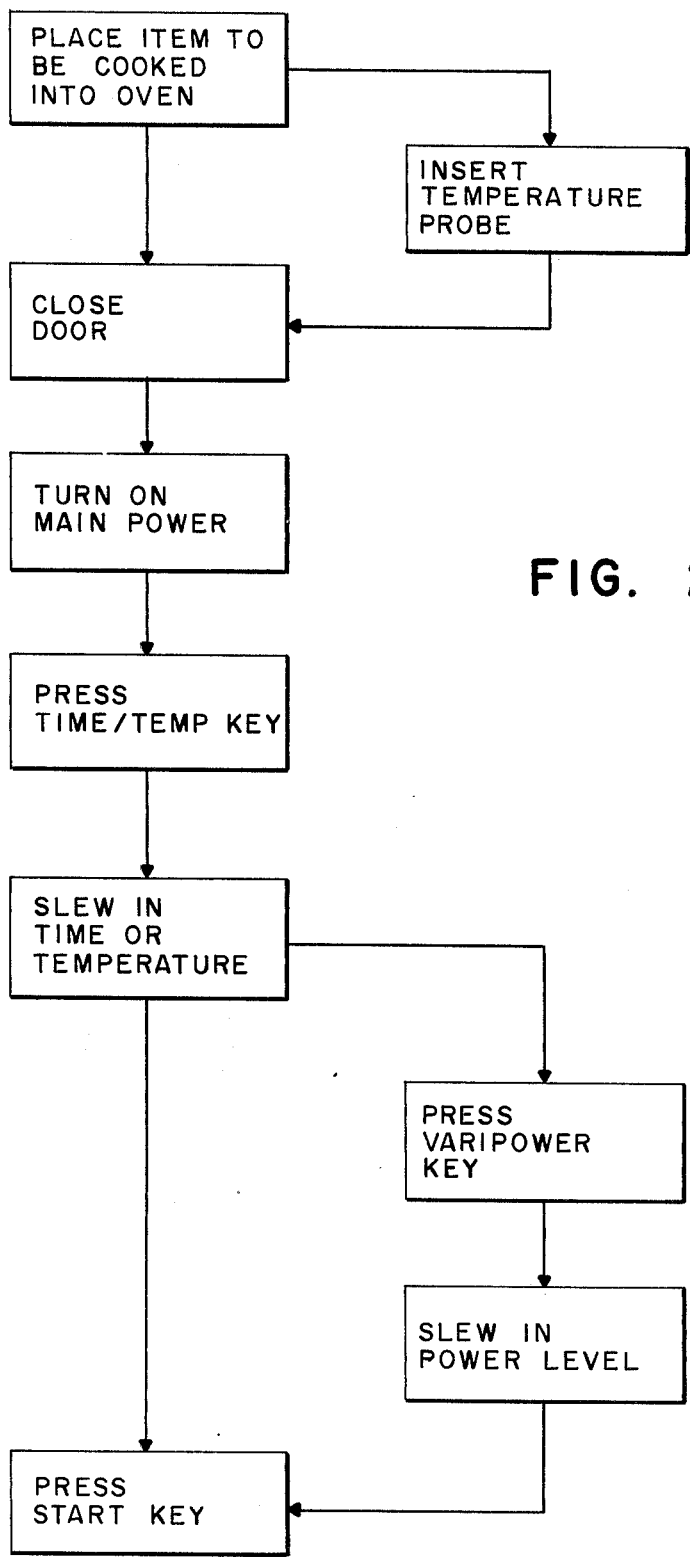

The novel features believed characteristic of the invention are set forth in the appended claims. The nature of the invention, however, as well as its essential features and advantages, may be understood more fully upon consideration of illustrative embodiments when read in conjunction with the accompanying drawings, wherein:

FIG. 1 is a combined plan view of a keyboard and display with a block diagram of associated circuitry for controlling a microwave oven of the present invention; and FIG. 2 is a flow chart of events commonly used in initiating a cooking cycle of the oven system shown in FIG. 1.

Referring now to the drawings, and in particular to FIG. 1, the organization of a microwave oven control system of the present invention is indicated generally by reference numeral 10. The system 10 has a keyboard 12 and a display 14, which are accessible to the user. User commands received by the keyboard 12 are communicated to digital control circuitry 16, which directs various oven operations and outputs alpha-numeric data to the display 14. MOS/LSI devices, such as microprocessors, are commercially available for implementing the control circuitry 16 on a printed circuit board (not shown). The control circuitry 16 directs the operation of a suitable source of microwave energy, such as a triac-controlled magnetron power supply 18, in accordance with known techniques. Safety features such as door interlocks 20 are in communication with the control circuitry 16 to prevent improper operation of the oven system 10. The control circuitry 16 operates a suitable audible alarm such as a buzzer or speaker 22 to announce the end of cooking. Additional options include a temperature probe 24 of known construction, which permits more accurate cooking of meat dishes, etc. A digital-to-analog converter 26 provides an appropriate signal to a differential amplifier 28 for comparison with a signal from the temperature probe 24. The differential amplifier 28 signals the control circuitry 16 when the temperature measured by the probe 24 reaches the temperature setting entered by way of the keyboard 12 in a manner more fully described below.

The oven control system 10 provides the user with two alternate modes of operation: time or temperature. The control circuitry 16 senses whether the temperature probe 24 has been inserted in its electrical receptacle in the oven, and accordingly operates in either the time mode or the temperature mode. Located on the keyboard 12 are a plurality of keys of suitable construction. The keys of the keyboard 12 preferably comprise air gap switches, but any suitable finger-actuable elements will suffice. A time/temp key 30 permits entry of a time setting or a temperature setting into registers of a memory portion of the control circuitry 16. Pressing the key 30 with the control circuitry 16 in the time mode permits loading of a time setting into the display 14 and simultaneously into a time register 32; pressing the key 30 with the control circuitry in the temperature mode permits loading of a temperature setting into the display 14 and simultaneously into a temperature register 34. In addition, the user can optionally select a power level less than full power by means of a "varipower" key 36. After pressing key 36, a percentage of full power can be loaded into the display 14 and simultaneously into a power-level register 38. Also located on the keyboard 12 are a clear key 40 for altering data entry and a start key 42 for initiating the cooking cycle.

Data entry, whether for time, temperature, or power level, is slewed into the display 14 by means of four digit-entry keys, indicated collectively by reference numeral 44. Each of the keys 44 corresponds to a digit position of the display 14. Keys $K_1$, $K_2$, $K_3$, and $K_4$ of the keyboard 12 control respectively digits $D_1$, $D_2$, $D_3$, and $D_4$ of the display 14. The display 14 includes a colon symbol 46, which is lit only when time data is being displayed.

With reference to FIG. 2, a flow chart illustrates by way of example the typical events involved in initiating a cooking cycle. It will be appreciated that the various events shown in FIG. 2 can be performed in other sequences, and that other events can be introduced into the sequence. For example, opening and closing the door or the use of the clear key 40 may occur at various times in other possible sequences of events. As a typical first step, however, the item to be cooked is placed in the oven. Then, optionally, the temperature probe 24 can be installed in its receptacle and inserted into the item. As indicated above, when the temperature probe 24 is installed in its receptacle a signal is sent to the oven system 10 causing operation in the temperature mode; operation in the time mode occurs in the absence of such signal. Next in the typical sequence of events, the door is closed and the main power is turned on. Then, the time/temp key 30 is pressed as a first step in the data entry process. Depending on whether the temperature probe is inserted, a time or temperature setting may then be slewed into the display 14 and the appropriate memory register using the digit keys 44. Then, optionally, a power level less than full power can be entered by pressing the varipower key 36 and slewing in the desired percentage of full power. Finally, with the data entry process complete, the start key 42 is pressed to initiate the cooking cycle.

The particular operation of the slew entry in the presently most preferred embodiment of the oven system 10 will now be described. After pressing key 30 in the above-described sequence of events, operation in the time mode will be indicated by a display reading of four zeros with the colon symbol 46 being lit, whereas operation in the temperature mode will be indicated by a display reading of "100" with the colon symbol 46 turned off.

After pressing key 30 with the system 10 in the time mode, each digit of the display 14 can be slewed through a count sequence of the ten Arabic numerals 0–9 with continuous rollover from numeral 9 to numeral 0, preferably at a rate of two counts per second. Each of the digit entry keys, $K_1$, $K_2$, $K_3$, and $K_4$ controls its corresponding display digit $D_1$, $D_2$, $D_3$, and $D_4$ in a totally separate and independent manner. In other words, there is no carryover between digit positions. After slewing the display 14, the two least significant digits $D_1$ and $D_2$ give the desired number of seconds of cooking time, and the most significant digits $D_3$ and $D_4$ give the desired number of minutes of cooking time, the maximum time being 99 minutes and 99 seconds. The time setting thus entered into the display 14 is simultaneously entered into the time register 32. The cooking cycle can then be initiated (assuming the door is closed) by pressing the start key 42, which causes the register 32 to decrement in seconds to zero. The state of register 32 is continually read out on the display 14 so that the user is always informed of the time left to cook.

Alternatively, with the system 10 in the temperature mode, pressing key 30 permits entry of a temperature setting, divisible by five, between and including 100° F. to 195° F. Slewing $K_1$ causes digit $D_1$ to alternate between zero and five. Slewing $K_2$ causes digit $D_2$ to count through numerals 0–9 with continuous rollover. Keys $K_3$ and $K_4$ are locked out with digit $D_3$ reading "1" and digit $D_4$ being blank. The temperature setting thus entered into the display 14 is simultaneously entered into the temperature register 34. When the cooking cycle is initiated by pressing the start key 42, the display 14 returns to a reading of 100° F. After the temperature measured by the probe 24 reaches 100° F., the display 14 will read out the probe temperature in increments of 5° F. Cooking continues until the probe temperature reaches the temperature setting recorded in register 34.

Operation at a power level less than full power is accomplished by first pressing the varipower key 36 and then slewing $K_2$. This causes digit $D_2$ to count through numerals 0–9 with continuous rollover. Keys $K_1$, $K_3$, and $K_4$ are locked out with digit $D_1$ reading zero and digits $D_3$ and $D_4$ being blank. Accordingly a percentage of full power in ten percent increments is thus entered into the display 14 and simultaneously entered into the power-level register 38. The number thereby recorded in register 38 causes the magnetron 18 to operate at an appropriate duty cycle during cooking. If the above procedure for selecting a particular duty cycle is not employed, the magnetron 18 will operate at 100 percent duty.

After the control circuitry 16 has been programmed using the above described slew entry techniques, the cooking program is carried out by pressing the start key 42. As long as the door remains closed, cooking continues until either the set time or set temperature is reached, whereupon cooking ceases, the speaker or buzzer 22 emits a sound, and the display 14 is blanked. If the door is opened while the oven is cooking, the magnetron 18 will turn off; however, if the door is thereafter closed and the start key 42 pressed, the system 10 will resume operation as though no interruption occurred. Opening the door during time-controlled cooking causes the display 14 to stop decrementing the time left to cook. Opening the door during temperature-controlled cooking, however, does not affect the display 14, which continues to read out the temperature measured by the probe 24 (for temperatures above 100° F.).

Although the decrementing time or probe temperature is normally displayed during cooking, the state of registers 34 and 38 can be displayed without modifying or interrupting the cooking program being carried out. Take for example a time-controlled cooking at a percentage of full power. The user can determine the power-level setting previously entered by pressing the varipower key 36, thus displaying the state of register 38. Thereafter pressing either the time/temp key 30 or the start key 42 will cause the state of the time register 32 to again be displayed. Additionally, during temperature-controlled cooking, the user can determine the temperature setting previously entered by pressing the time/temp key 30, thus displaying the state of register 34. Thereafter pressing the start key 42 will cause the display to again read out "100" or the temperature measured by the probe 24, whichever is greater.

The clear key 40 can be used at any time during oven operation to return the system 10 to its initial power-up state. Pressing the clear key 40 blanks the display 14, resets the control circuitry 16, and stops any cooking that might have been under way. The reset conditions for registers 32, 34, and 38 represent zero time, 100° F., and 100 percent duty, respectively.

An option that may be employed as an alternative to shutting down at the end of a cooking cycle is operation at a reduced power level for holding the item in the oven warm for some period of time in the absence of interruption by the user. For example, the system 10 can be programmed so that, after the normal cooking cycle, it automatically switches to a magnetron duty cycle of ten percent for one hour. The above-described system 10 is entirely compatible in organization for implementation of such a hold warm option.

Those skilled in the art will appreciate the advantages of the various innovations of the disclosed control system. In particular, the slew entry techniques described herein permit a reduction in the number of keys needed for data entry. Furthermore, it will be appreciated that a simplification of control circuitry is achieved by virtue of the separate slewing of each digit without carryover between digit positions. Additionally, the system 10 is straightforward and easy for the user to operate. Numerous additional advantages will be suggested to those skilled in the art from this description of the presently preferred embodiments. Although a preferred embodiment of the present invention has been described in detail, it is to be understood that various changes, substitutions and alterations can be made therein without departing from the spirit and scope of the invention as defined by the appended claims.

What is claimed is:

1. A microwave oven control system comprising:
   a keyboard having a plurality of actuable keys for receiving user commands, the actuable keys including a plurality of digit entry keys for entering numerical operating data into the system,
   an electronic display having a plurality of digit positions for displaying the numerical operating data, each digit position being capable of selectively displaying the ten decimal numerals in response to actuation of a corresponding digit entry key, each digit position being slewed through a count sequence of some or all of the ten decimal numerals as long as the corresponding digit entry key is held actuated, whereby numerical operating data is entered into the display by holding one or more of the digits entry keys actuated until the desired numerals are displayed by the digit positions of the display, and
   control circuitry responsive to the commands from the keyboard for controlling the operation of the system and outputting data to the display.

2. The system of claim 1 further comprising a time register for storing a time setting entered into the display by separately slewing at least one digit position through a count sequence to a desired numeral.

3. The system of claim 2 wherein the digit positions of the display are four in number, each of which is slewed through a count sequence of all ten of the decimal numerals with continuous rollover and without carryover between digit positions upon actuation of the corresponding digit entry key, the two least significant digits representing seconds and the two most significant digits representing minutes.

4. The system of claim 1 further comprising a temperature register for storing a temperature setting entered into the display in degrees Fahrenheit, and means for detecting when a temperature probe is installed in a receptacle and thereupon causing the system to operate in a temperature mode.

5. The system of claim 4 further comprising means for entering a temperature setting during operation in the temperature mode, wherein the least significant digit position of the display is slewed through a sequence alternating between the numerals "0" and "5", wherein the next to least significant digit position of the display is slewed through a count sequence of all ten of the decimal numerals, and wherein a most significant digit is locked on the numeral "1", whereby a temperature setting between 100° F. and 195° F. in increments of 5° F. can be entered.

6. The system of claim 1 further comprising a power-level register, and means for entering duty-cycle data into the power-level register.

7. The system of claim 6 wherein the least significant digit position of the display is locked on the numeral "0" and the next to least significant digit position of the display is slewed through a count sequence of all ten of the decimal numerals, whereby a percentage duty cycle can be entered into the power-level register in multiples of ten between zero and 100 percent.

8. The system of claim 6 wherein the control circuitry further comprises means for automatically switching the system to a reduced power level for holding an item in the oven warm for a predetermined period of time after completion of a cooking cycle.

9. The system of claim 1 wherein the actuable keys of the keyboard include a time/temp key, which when actuated in a time mode permits entry of a time setting into the display, and which when actuated in a temperature mode permits entry of a temperature setting into the display.

10. The system of claim 9 wherein the control circuitry includes means for detecting the presence or absence of a temperature probe in a receptacle and accordingly causing operation in either the temperature mode or the time mode.

11. The system of claim 1 wherein the control circuitry includes a time register and a power-level register, and wherein the actuable keys of the keyboard include a first key for entering a time setting into the time register, a second key for entering a duty-cycle setting into the power-level register, and a third key for starting a cooking cycle.

12. The system of claim 11 wherein the control circuitry further includes means in communication with the keyboard and the display for alternatively displaying the state of the time register upon actuation of the first key or the state of the power-level register upon actuation of the second key without modificaiton or interruption of the cooking cycle.

13. The system of claim 1 wherein the control circuitry includes a temperature register, and wherein the actuable keys of the keyboard include a first key for entering a temperature setting into the temperature register and a second key for starting a cooking cycle.

14. The system of claim 13 further comprising means in communication with the control circuitry for measuring the temperature of an item being cooked, and the control circuitry further includes means in communication with the keyboard and the display for alternatively displaying the state of the temperature register upon actuation of the first key or the measured temperature of the item being cooked upon actuation of the second key without modification or interruption of the cooking cycle.

15. The system of claim 1 wherein the actuable keys of the keyboard include a clear key for blanking the display and resetting registers of the control circuitry.

16. A method of controllably cooking an item in a microwave oven, comprising the steps:
   (a) actuating a first control key to enable a storage register to receive data entry,
   (b) separately slewing a plurality of digit positions of a display and simultaneously loading a control parameter corresponding thereto into the enabled storage register, and
   (c) actuating a second control key to initiate a cooking cycle controlled in accordance with the stored control parameter.

* * * * *